United States Patent [19]

Taskier

[11] 3,853,601

[45] Dec. 10, 1974

[54] HYDROPHILIC MICROPOROUS FILM

[75] Inventor: Henry T. Taskier, Englewood, N.J.

[73] Assignee: Celanese Corporation, New York, N.Y.

[22] Filed: Apr. 18, 1972

[21] Appl. No.: 245,260

[52] U.S. Cl............ 117/98, 117/138.8 E, 136/146, 252/8.8
[51] Int. Cl............................................. B32b 27/16
[58] Field of Search .................... 117/98, 138.8 E; 106/287 SB; 252/351, 357, 8.8; 136/146

[56] References Cited
UNITED STATES PATENTS

| | | | |
|---|---|---|---|
| 2,846,458 | 8/1958 | Haluska .............................. | 252/351 |
| 2,917,480 | 12/1959 | Bailey et al. ....................... | 252/351 |
| 2,991,300 | 7/1961 | Schmidt et al...................... | 252/351 |
| 3,070,462 | 12/1962 | McConnell et al. ............. | 117/138.8 |
| 3,138,610 | 6/1964 | Buc et al............................ | 252/357 |
| 3,222,191 | 12/1965 | Steiner et al......................... | 106/13 |
| 3,238,056 | 3/1966 | Pall et al.............................. | 177/98 |
| 3,249,465 | 5/1966 | Chen................................ | 117/138.8 |
| 3,293,684 | 12/1966 | Tundermann..................... | 117/138.8 |
| 3,555,041 | 1/1971 | Katz..................................... | 252/8.8 |
| 3,558,764 | 1/1971 | Isaacson et al. ..................... | 264/209 |
| 3,563,784 | 2/1971 | Innes et al. ........................... | 117/47 |
| 3,620,821 | 11/1971 | Johnson........................... | 117/138.8 |

Primary Examiner—William D. Martin
Assistant Examiner—Sadie L. Childs
Attorney, Agent, or Firm—Thomas J. Morgan; Linn I. Grim; Marvin Bressler

[57] ABSTRACT

A hydrophobic microporous film comprising a hydrophilic microporous film and a surfactant coating of a silicon glycol copolymer which renders the coated microporous film hydrophilic. The hydrophilic microporous film of the instant invention more rapidly "wets" than microporous films of the prior art. A second surfactant, preferably an imidazoline tertiary amine, may also be included in the surfactant coating.

The hydrophilic microporous film has particular application as a battery separator which must be rapidly "wetted" to generate its electrical output.

8 Claims, No Drawings

HYDROPHILIC MICROPOROUS FILM

BACKGROUND OF THE DISCLOSURE

1. Field of the Invention

The instant invention is directed to a hydrophilic microporous film and the process for making same. More particularly, the instant invention is directed to a hydrophilic microporous film comprising a hydrophobic microporous film and a surfactant coating and the process for making the film. Still more particularly, the instant invention is directed to a battery separator comprising a hydrophobic microporous film rendered hydrophilic by a surfactant coating of a silicon glycol copolymer and the process for making said separator.

2. Background of the Prior Art

Recent developments in but not limited to, the area of microporous polymeric film, exemplified by U.S. Pat. No. 3,426,754, issued on Feb. 11, 1969, U.S. Pat. No. 3,558,764, issued on Jan. 26, 1971, copending U.S. Application, Ser. No. 867,425, filed on Nov. 13, 1969, U.S. Pat. No. 3,679,538, issued on July 25, 1972, and copending U.S. Patent Application, Ser. No. 104,715 filed on Jan. 7, 1971 have instigated studies to discover applications which could exploit the unique properties of these new films.

One disadvantage of these films, which in the past has limited the number of applications to which these films many be put, has been the hydrophobic nature of most of these films. This is especially true when polyolefinic films, a preferred type of polymeric material often employed in the manufacture of microporous films are employed. Because they would not be "wetted" with water and aqueous solutions they could not be used in such logical applications as filter media and the like. Fortunately, this major drawback to the use of microporous films has been overcome with the discovery that these films may be made to wet with water and aqueous media, or alternatively stated, be made hydrophilic by coating with surfactant. The specifics of this discovery is disclosed in copending U.S. Application, Ser. No. 106,654, filed on Jan. 14, 1971.

That hydrophilic microporous films may be produced has suggested an application where microporous films would present a dramatic improvement over the current state of the art. That is, as a battery separator. A battery separator is a critical component of a battery. A battery is comprised of one or more electrolytic cells enclosed by a housing. Each cell includes two electrical terminals or electrodes, the anode and the cathode. The electrodes are immersed in a conducting medium, the electrolyte. Electrical current flows between the electrodes. This electrical current results from the flow of electrons in the conducting electrolyte. Just as electrons, negatively charged particles flow in the electrolyte so do ions, large positively charged species. Although it is absolutely essential to the production of a electrical current that electrons flow between electrodes it is usually detrimental in a battery for ions to flow to the cathode, the negatively charged terminal, since this decreases the driving force, thus decreasing the flow of electrons. To prevent ionic flow between terminals, while maintaining electron flow, is the function of a battery separator. The battery separator is disposed in electrolytic cell between the anode and cathode of the electrolyte to prevent ion migration.

The above description suggests the type of material that should ideally be used as a battery separator. An excellent battery separator is one which has pore openings which are small enough to prevent large species, such as ions to flow through its pores yet large enough to permit the flow of electrons through these pores. Similarly, the battery separator should be of minimum thickness in view of the well known fact that the flow of electrons across a battery separator is inversely proportional to the thickness of the separator.

Another requirement of a battery separator suggests itself when one considers that the electrolytes employed in most battery applications are highly basic or acidic. A good battery separator should be inert, to these highly corrosive materials.

A final requirement for a good battery separator is that the separator be wetted by the electrolyte employed. In view of the fact that essentially all of the electrolytes currently utilized are aqueous solutions, this requirement necessitates that the battery separator be hydrophilic. The battery separator must be totally wetted so as to provide a continuous electrolytic path on either side of the battery separator to permit the flow of electrons therethrough. An analogy can be drawn to an electrically conducting wire. A break in the wire cuts off the flow of electrons. So, in the case of an electrolyte, the non-wetting of a portion of a battery separator effectively cuts off the path for electron flow over the non-wetted area, thus, cutting down on the output of the battery.

In the prior art many battery separators have been advanced. Many of the separators excellently furnish one or more of the necessary characteristics. However, few if any are excellent in each of these characteristics. For example, cellulosic films possess a pore size which permits the flow of electrons while preventing ionic flow. Celluolsics are reasonably satisfactory in terms of minimum thickness. However, their resistance to strong acids and bases are minimal and they often fail relatively due to chemical attack. Specially treated polyvinyl chloride films have good resistance to chemical attack. However, their thickness makes for high electrical resistance thus decreasing the electrical output of the battery.

As stated above copending U.S. Application, Ser. No. 106,564 teaches surfactant coating of a hydrophobic microporous film. Thus any of the surfactants suggested in the copending application will provide a hydrophilic film. Seemingly, this should be enough to ipso facto produce a satisfactory battery separator. Unfortunately, in addition to above-discussed criteria for battery separators, an additional criterion in the form of a further restriction on wettability is imposed. That is, wettability must result immediately. Thus water and aqueous solutions must pass through the pores of the battery separator immediately after contact therewith. Complete wettabiliy, as stated above, is essential for the generation of the rated electrical output of the battery. As those skilled in the art are aware battery manufacturers immediately test their batteries after fabrication. This immediate test is made to permit the manufacturer to determine the proper functioning of his batteries. A manufacturer cannot wait long periods for the battery separator to wet and thus conduct an electrical current. This would require immense storage area or diminished production levels. A more dramatic example of the need for immediate wettability is provided by batteries of the type which are not filled with electrolyte until the battery is purchased. Obviously, a purchaser is not in a position to wait a few days for wettability to be established to permit the necessary electrical output.

This further requirement for battery separators, rapid wettability is not provided in the surfactant coated microporous polymer film disclosed in copending application, Ser. No. 106,564. It has been found that none of the surfactant coatings suggested therein provide the combination of properties, including rapid wettability necessary in battery separators. This result is to be expected in that application, Ser. No. 106,564 is directed primarily to applications where a pressure gradient is imposed across the coated film, i.e., as a filter. The imposition of a pressure gradient compensates for low wettability, that is, the pressure overcomes the surface tension associated with hydrophobic surfaces to permit the flow of aqueous liquids across the porous surface of the coated film. Unfortunately, a battery separator is an example of an application where no positive pressure gradient is or can be imposed across the separator.

That the copending application does not anticipate battery separators as an application for the coated films therein disclosed is evidenced by the failure to enumerate battery separators as an application of that coated microporous film invention.

BRIEF SUMMARY OF THE INVENTION

The instant invention is directed to a hydrophilic microporous film comprising a surfactant coated hydrophobic microporous polymeric film and a process for forming it. The hydrophilic film of the instant invention has properties which include: a pore size sufficiently small to bar the flow of ions but large enough to permit the flow therethrough of electrons; a small enough thickness to minimize the resistance caused by electron flow thereacross; a chemical inertness sufficient to resist chemical attack by strong acids and bases of the type used as electrolytes; a high level of wettability which is provided almost immediately after contact with water and water base liquids. These properties make the hydrophilic film of the instant invention an excellent battery separator.

In accordance with the instant invention a hydrophilic microporous film is provided comprising a hydrophobic microporous film, characterized by having a reduced bulk density as compared to the bulk density of the corresponding non-porous precursor film from which it is formed, a crystallinity of about about 30 percent, an average pore size of about 100 to 12,000 Angstroms, a surface area of about 2 to about 200 meters per gram, and a void volume of 20 to 45 percent. The battery separator of the instant invention also includes a coating of a silicon glycol copolymer surfactant. Preferably the surfactant represents 2 to 20 percent by weight of the uncoated microporous film. In a preferred embodiment of the instant invention, the microporous film of the instant invention is coated with a coating which comprises a silicon glycol copolymer with a second surfactant, preferably an imidazoline tertiary amine.

The instant invention is also directed to a process for forming a hydrophilic microporous film of the instant invention. In the process of the instant invention, a microporous polymeric film having the properties enumerated above is coated with a surfactant coating comprising a silicon glycol copolymer to form the battery separator described above. In a preferred embodiment the surfactant coating includes, along with the silicon glycol copolymer, a second surfactant, an imidazoline tertiary amine.

DETAILED DESCRIPTION

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

Further, the pores of the porous films of the present invention are microscopic, i.e., the details of their pore configuration or arrangement are discernible only by microscopic examination. In fact, the open cells or pores in the films generally are smaller than those which can be measured using an ordinary light microscope, because the wavelength of visible light, which is about 5,000 Angstroms (an Angstrom is one tenbillionth of a meter), is longer than the longest planar or surface dimension of the open cell or pore. The microporous films of the present invention may be identified, however, by using electron microscopy techniques which are capable of resolving details of pore structure below 5,000 Angstroms.

The microporous films of the present invention are also characterized by a reduced bulk density, sometimes hereinafter referred to simply as a "low" density. That is, these microporous films have a bulk or overall density lower than the bulk density of corresponding films composed of identical polymeric material but having no-open celled or other voidy structure. The term "bulk density" as used herein means the weight per unit of gross or geometric volume of the film, where gross volume is determined by immersing a known weight of the film in a vessel partly filled with mercury at 25°C. and atmospheric pressure. The volumetric rise in the level of mercury is a direct measure of the gross volume. This method is known as the mercury volumenometer method, and is described in the *Encyclopedia of Chemical Technology*, Vol. 4, page 892 (Interscience 1949).

Porous films have been produced which possess a microporous, open-celled structure, and which are also characterized by a reduced bulk density. Films possessing this microporous structure are described, for example, in U.S. Pat. No. 3,426,754 which patent is assigned to the assignee of the present invention. This preferred method of preparation described therein involves drawing or stretching at ambient temperatures, i.e., "cold drawing," a crystalline, elastic starting film in an amount of about 10 to 300 percent of its original length, with subsequent stabilization by heat setting of the drawn film under a tension such that the film is not free to shrink or can shrink only to a limited extent.

While the above described microporous or void-containing film of the prior art is useful in this invention the search has continued for new processes able to produce open-celled microporous films having a greater number of pores, a more uniform pore concentration of distribution, a larger total pore area, and better thermal stability of the porous or voidy film. These properties are significant in applications such as when used as a battery separator where a large number of uniformly distributed pores are necessary or highly desirable.

It is submitted however that the process disclosed in U.S. Pat. No. 3,426,754 and the improvement thereof, hereinafter defined in detail, are equally capable of producing a microporous product which may be rendered hydrophilic by this invention.

An improved process for preparing open-celled microporous polymer films from non-porous, crystalline, elastic polymer statring films, includes (1) cold stretching, i.e., cold drawing the elastic film until porous surface regions or areas which are elongated normal or perpendicular to the stretch direction are formed, (2) hot stretching, i.e., hot drawing, the cold stretched film unitl fibrils and pores or open cells which are elongated parallel to the stretch direction are formed, and thereafter (3) heating or heat setting the resulting porous film under tension, i.e., at substantially constant length, to impart stability to the film. Yet another process is similar to this process but consolidates steps (2) and (3) into a continuous, similtaneous, hot stretching-heat setting step, said step being carried out for a time sufficient to render the resulting microporous film substantially (less than about 15 percent) shrink resistant.

The elastic starting film or precursor film is preferably made from crystalline polymers such as polypropylene or other polyolefins by melt extruding the polymer into a film, taking up the extrudate at a drawdown ratio giving an oriented film, and thereafter heating or annealing the oriented film if necessary to improve or enhance the initial crystallinity.

The essence of the improved processes is the discovery that the sequential cold stretching and hot stretching steps impart to the elastic film a unique open-celled structure which results in advantageous properties, including improved porosity, improved thermal stability and a gain or enhancement of porosity when treated with certain organic liquids such as perchloroethylene.

As determined by various morphological techniques or tests such as electron microscopy, the microporous films of the improved process are characterized by a plurality of elongated, non-porous, interconnecting surface regions or areas which have their access of elongation substantially parallel. Substantially alternating with and defined by these non-porous surface regions are a plurality of elongated, porous surface regions which contain a plurality of parallel fibrils or fibrous threads. These fibrils are connected at each of their ends to the non-porous regions, and are substantially perpendicular to them. Between the fibrils are the pores or open cells of the films utilized by the present invention. These surface pores or open cells are substantially interconnected through tortuous paths or passageways which extend from one surface region to another surface area or region.

With such a defined or organized morphological structure, the films of the present invention may have a greater proportion of surface area that the pores cover, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

In fact the total surface area per gram of material of the films of this invention, as determined by the "BET Method" which is described in detail in the Journal of the American Chemical Society, Vol. 60, pp. 309-316 (1938), is in the range of from 2 to about 200 square meters per gram. Preferably the range is from about 5 to about 100 square meters per gram and most preferably from about 20 to 60 square meters per gram. These values can be compared with normal pin-holed film which has a total surface area per gram of about 0.1 square meter; paper and fabric which have values per gram of about 1.0 square meters and leather which has a value of about 1.6 square meters per gram. Additionally, the volume of space per volume of material range from about 0.05 to about 1.5 cubic centimeters per gram, and most preferably from 0.2 to about 0.85 cubic cc. per gram. A more convenient way of expressing this porosity property is as a fraction of the total film volume. Thus, the void volume is in the range of between 20 and 45 percent, as determined by gravimetric methods. More preferably, the percent void volume is in the range of 25 to 35 percent. Additional data to define the films of this invention relates to nitrogen flux measurements, wherein the microporous films have Q (or nitrogen) Flux values in the range of from about 5 to 400 preferably about 50 to 300.

Nitrogen flux may be calculated by mounting a film having a standard surface area of 6.5 square centimeters in a standard membrane cell having a standard volume of 63 cubic centimeters. The cell is pressurized to a standard differential pressure (the pressure drop across the film) of 200 pounds per square inch with nitrogen. The supply of nitrogen is then closed off and the time required for the pressure to drop to a final differential pressure of 150 pounds per square inch as the nitrogen permeates through the film is measured with a stop watch. The nitrogen flux, Q, in gram moles per square centimeter minute, is then determined from the equation:

$$Q = 27.74 \times 10^3/\Delta t \times T$$

where $\Delta t$ is the change in time measured in seconds and T is the temperature of nitrogen in degrees Kelvin. The above equation is derived from the gas law, $PV = Z_n RT$.

The microporous films of the present invention are formed from a starting elastic film of crystalline, film-forming, polymers. These elastic films have an elastic recovery at zero recovery time (hereinafter defined) when subjected to a standard strain (extension) of 50 percent at 25°C. and 65 percent relative humidity of at least about 40 percent, preferably at least about 50 percent, and most preferably at least about 80 percent.

Elastic recovery as used herein is a measure of the ability of a structure or shaped article such as a film to return to its original size after being stretched, and may be calculated as follows: Elastic Recovery (ER) =(length when stretched)−(length after stretching)- /length added when stretched × 10

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent and most preferably at least 30 percent and most preferably at least 50 percent, e.g., about 50 to 90 percent, ore more. Percent crystallinity is determined by the x-ray method described by R. G. Quynn et al. in the *Journal of Applied Polymer Science*, vol. 2, No. 5 pp. 166–173 (1959). For a detailed discussion of crystallinity and its significance in polymers, see *Polymers and Resins*, Golding (D. Van Nostrand, 1959).

Preferred suitable starting elastic films, as well as the preparation thereof, are further defined in British Pat. No. 1,198,695, published July 15, 1970. Other elastic films which may be suitable for the practice of the present invention are described in British Pat. No. 1,052,550, published Dec. 21, 1966 and are well known in the art.

The starting elastic films utilized in the preparation of the microporous films of the present invention should be differntiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing termperature and complete loss of elastic properties as the glass transition temperatures, are particularly consequences of entropy-elasticity. The elasticity of the starting elastic films utilized herein, on the other hand, is of a different nature. In qualitative thermodynamic experiments with these elastic starting films, increasing stress with decreasing temperature (negative temperature coefficient) may be interpreted to mean that the elasticity of these materials is not governed by entropy effects but dependent upon an energy term. More significantly, the starting elastic films have been found to retain their stretch properties at temperatures where normal entropy-elasticity could no longer be operative. Thus, the stretch mechanism of the starting elastic films is thought to be based on energy-elasticity relationships, and these elastic films may then be referred to as "non-classical" elastomers.

As stated, the starting elastic films employed in this invention are made from a polymer of a type capable of developing in significant degree of crystallinity, as contrasted with more conventional or "classical" elastic materials such as the natural and synthetic rubbers which are substantially amorphous in their unstretched or tensionless state.

As significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecen-1, n-octadecene-1 or other relatively long chain alkenes, as well as copolymers of 3-methyl pentene-1 and any of the same n-alkenes mentioned previously in connection with 3-methyl butene-1. These polymers in the form of film should generally have a present crystallinity of at least 20 percent, preferably at least 30 percent, and more preferably about 50 percent to 90 percent or higher. In the preferred films of the instant invention, the crystallinity ranges between about 30 percent to about 60 percent and more preferably between 50 percent and about 60 percent.

For example, a film-forming homopolymer of polypropylene may be employed. When propylene homopolymers are contemplated, it is preferred to employ an isotactic polypropylene having a percent crystallinity as indicated above, a weight average molecular weight ranging from about 100,000 to 750,000 preferably about 200,000 to 500,000 and a melt index (ASTM-1958D–1238–57T, Part 9, page 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is at "random" oxymethylene copolymer, on which containes recurring oxymethylene, i.e., $-CH_2-O-$, units interspersed with $-OR-$ groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and where a major amount of the $-OR-$ units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent or higher. Further, these polymers have a melting point of at least 150°C., and a number average molecular weight of at least 10,000. For a more detailed discussion of acetal and oxymethylene polymers, see *Formaldehyde*, Walker, pp. 175–191, (Reinhold 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and need not be described further herein for sake of brevity.

The types of apparatus suitable for forming the starting elastic films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heated elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils.

Using this type of apparatus, film may be extruded at a drawdown ratio of about 20:1 to 200:1, preferably 50:1 to 150:1.

The terms "drawdown ratio" or, more simply, "draw ratio," as used herein is the ratio of the film wind-up or take-up speed to the speed of the film issuing at the extrusion die.

The melt temperature for film extrusion is, in general, no higher than about 100°C. above the melting point of the polymer and no lower than about 10°C. above the melting point of the polymer.

For example, polypropylene may be extruded at a melt temperature of about 180°C. to 270°C., preferably 200°C. to 240°C. Polyethylene may be extruded at a melt temperature of of about 175°C. to 225°C., while acetal polymers, e.g., those of the type disclosed in U.S. Pat. No. 3,027,352 may be extruded at a melt temperature of about 185°C. to 235°C, preferably 195°C. to 215°C.

The extrusion operation is preferably carried out with rapid cooling and rapid drawdown in order to obtain maximum elasticity. This may be accomplished by having the take-up roll relatively close to the extrusion slot, e.g., within two inchces and, preferably, within one inch. An "air knife" operating at temperatures between, for example 0°C. and 40°C., may be employed within one inch of the slot to quench, i.e., quickly cool and solidify the film. The take-up roll may be rotated, for example, at a speed of 10 to 100 ft/min, preferably 50 to 500 ft/min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide quick and effective cooling. Means such as cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the $D_2/D_1$ ratio, for example, 0.5 to 6.0 and preferably about 1.0 to about 2.5, and the take-up speed, for example 30 to 700 ft/min. The melt temperature may be within the ranges given previously for straight slot extrusion.

The extruded film may then be initially heat treated or annealed in order to improve crystal structure, e.g., by increasing the size of the crystalline and removing imperfections therein.

The resulting partly-crystalline film is then preferably subject to a process generally comprising either the consecutive steps of cold stretching, hot stretching and heat setting or the consecutive steps of cold stretching and simultaneously hot stretching and heat setting. Of course, less preferably variations on this process (such as the elimination of the hot stretching step) can be carried out resulting in microporous films which, although inferior to those films made by the cold stretch — hot stretch — heat set process, still find utility as the microporous films of this invention.

The term "cold stretching" as used herein is defined as stretching or drawing a film to greater than its original length and at a stretching temperature i.e., the temperature of the film being stretched, less than the temperature at which the melting of the film begins when the film is uniformly heated from a temperature of 25°C. at a rate of 20°C. per minute. The terms "hot stretching" or "hot stretching-heat setting" as used herein is defined as stretching above the temperature at which melting begins when the film is heated from a temperature of 25°C. at a rate of 20°C. per minute, but below the normal melting point of the polymer, i.e., below the temperature at which fusion occurs. For example, using polypropylene elastic film, cold stretching is carried out preferably below about 120°C. while hot stretching or hot stretching-heat setting is carried out above this temperature.

When a separate heat setting step is employed, it follows the cold stretching-heat stretching steps and is carried out at from about 125°C. up to less than the fusion temperature of the film in question. For polypropylene the range preferably is about 130°C. to about 160°C.

The resulting microporous film exhibits a final crystallinity of preferably at least 30 percent, more preferably about 50 to 100 percent as determined by the aforementioned x-ray method. Furthermore, this film exhibits an average pore size of about 100 to 12,000 Angstroms more usually 150 to 5,000 Angstroms, the values being determined by mercury porosimetry as described in an article by R. G. Quynn et al., on pages 21–34 of *Textile Research Journal*, January 1963.

As stated herein, it was surprisingly found in U.S. Application, Ser. No. 106,564 filed on Jan. 14, 1971 that by treating a normally hydrophobic microporous surface, such as a film of the type described hereinbefore, with a surfactant causes the surface to become hydrophilic. This result, as indicated in the copending application, is particularly surprising in view of the lack of any chemical reaction between the surfactant and the hydrophobic surface. (The term "hydrophobic" is defined as meaning a surface which passes less than about 0.010 milliliter of water per minute per sq.cc. of flat film surface under a water pressure of 100 psi. Likewise the term "hydrophilic" is meant to be applied to those surfaces which pass greater than about 0.01 milliliter of water per minute per sq.cc.).

As stated in the copending application, Ser. No. 106,564, surfactants which when applied to a film produce a film which exhibits a contact angle with water of less than about 80°, preferably about 60° are suitable for making such a film hydrophilic. (The contact angle is defined as the angle between the coated surface and the tangent to a drop of water which has been applied to the surface at its point of contact with the surface, where the contact angle is measured with the film before it has been rendered microporous).

Although the surfactants disclosed in copending application, Ser. No. 106,564, all form hydrophilic microporous films when coated on the surface of the hydrophobic film substrate, none of them were suitable as battery separators in many applications for the reasons given above. In summary, the hydrophilic microporous film, in order to be suitable as a battery separator must wet, immediately so that the battery can provide its rated electrical output immediately.

Surfactant coated microporous films have now been unexpectedly found which provide all the desirable features of the surfactant coated microporous films of the prior art but which additionally posses the property of almost immediately wetting when placed in contact with aqueous media. Because of these properties the surfactant coated hydrophilic microporous film of the instant invention is uniquely suited for use as a battery separator.

The hydrophilic microporous film of the instant invention comprises a hydrophobic microporous polymeric film made by the procedures enumerated in detail above. This microporous film of the instant invention has a reduced bulk density as compared to the bulk density of the corresponding non-porous precursor film. The crystallinity of the film, as stated above, is above about 30 percent. More preferably, the crystallinity of the microporous film is in the range of about 30 percent to 70 percent. Still more preferably the crystallinity is in the range of 50 percent to 70 percent. The pores of porous films of the present invention are microscopic, and are preferably in the range of 100 to 12,000 Angstroms. More preferably, the pores are no larger than 5,000 Angstroms. The microporous film of the instant invention has, as previously stated, a total surface area of from 2 to 200 square meters per gram. More preferably, the microporous film of the instant invention has a surface area in the range of from 20 to 60 square meters per gram. The void volume of the microporous film, mentioned previously is in the range of about between 20 percent and 45 percent. More preferably, the void volume is in the range of about between 25 percent and 35 percent. In a preferred embodiment, the polymeric material from which the microporous film of the instant invention is formed is polypropylene.

In a preferred embodiment of the instant invention, the hydrophilic microporous polymeric film of the instant invention has a preferred thickness of about 1 mil (0.001 inch). As stated above, the lesser the thickness of a hydrophilic microporous film, when employed as a battery separator the lower the resistance to electrical flow in the cell in which it is disposed. Thus, in turn, it is probably due to increased difficulty of maintaining electrolyte continuity through the porous separator with increased separator thickness. In addition, a thinner battery separator permits less volume to be occupied by each of the cells of the battery which increases compactness of the battery. The lesser the volume of the cell, the closer are the electrodes to one another. As those skilled in the art are aware, the closer the anode and cathode are to each other the more the efficient the operation of the electrolytic cell.

The hydrophilic microporous film of the instant invention also comprises a surfactant coating which renders the hydrophobic microporous film hydrophilic. The surfactant coating comprises a silicon glycol copolymer. More specifically, the preferred class of silicon glycol copolymers employed is polyoxyethylene polymethyl siloxane. Coating the microporous polymeric film of the instant invention with the preferred non-ionic silicon glycol polymer surfactant of the instant invention surprisingly renders the microporous film hydrophilic in a time much shorter than the surfactant coatings of the prior art. This is evidenced by the dramatic decrease in resistivity of a microporous film coated with a silicon glycol copolymer when disposed in an electrolytic cell filled with a strong electrolyte as compared with surfactant coated microporous films of the prior art.

The hydrophilic microporous film of the instant invention, may comprise in another preferred embodiment, a surfactant which comprises in addition to a silicon glycol copolymer a second surfactant. This second surfactant blended with the silicon glycol copolymer is in a preferred embodiment an imidazoline. Imidazolines are tertiary amines. The cationic imidazoline surfactants in combination with silicon glycol copolymer surfactants produce excellent results is indeed unexpected in view of the inadequacy of imidazoline surfactants alone to produce the rapid wettability necessary in battery separator applications.

In a preferred embodiment the quantity of surfactant coated onto the microporous film represents about 2 to 20 percent by weight of the uncoated microporous film substrate. More preferably, this "add-on" is in the range of about 9 to 15 percent by weight of the uncoated microporous film substrate. Still more preferably, the quantity of surfactant coated onto the surface of the microporous film, the "add-on," represents about 10 to 13 percent by weight of the uncoated microporous film substrate.

The instant invention also includes a process for forming a hydrophilic microporous film. In the process of the instant invention, a hydrophobic microporous film, having the properties discussed above, is coated with a surfactant coating comprising a silicon glycol surfactant, preferably polyoxyethylene polymethyl siloxane, or a combination of a silicon glycol with a second surfactant, preferably an imidazoline to form the hydrophilic microporous film of the instant invention. Any of the well known coating methods may be employed to coat the microporous film. One preferred method is reverse roll coating. In this method a doctor roll is disposed partially in a bath of the surfactant coating solution. A second driven roll guides the uncoated hydrophobic microporous film web through the nip formed by itself and the doctor roll. The two rolls which are preferably separately driven, rotate in the same direction so that the coated film web is guided in the direction from whence the uncoated film originates. The amount of surfactant coating disposed on the film is a function of the difference in speed of the doctor roll and the second film driving roll and also the size of the nip formed by the two rolls.

In a second preferred embodiment the squeeze roll method is used. The film in this method is guided into a bath of the surfactant solution and squeezed between two squeeze rolls disposed downstream thereof. The amount of coating is thus a function of the gap size between the two squeeze rolls and the pressure exerted therebetween.

A third preferred method of coating the substrate hydrophobic microporous film is the wire wound metering rod method. This method is the same as the squeeze roll method except that the microporous film after being coated by being guided through a bath of the surfactant solution is squeezed between a pair of wire wound metering rods which control the amount of coating disposed thereon by the configuration of the wires wound around the metering rods.

In the above three methods the amount of coating is a function of one or two variables discussed in the description of the methods. In addition, in all three methods the amount of surfactant coating coated onto the film is also a function of the strength of the surfactant solution. The surfactant, whether it be silicon glycol copolymer alone or silicon glycol copolymer with a second surfactant is formed into a solution by the addition of a common organic solvent such as acetone, methanol, ethanol, isopropynol or the like. The solution is preferably dilute. In a preferred embodiment, the surfactant solution represents 1 to 10 percent by weight of surfactant. More preferably, the surfactant solution, is about 5 to 10 percent by weight of the surfactant. Still more preferably the surfactant solution strength is 6 percent by weight of the surfactant.

The following examples are given to illustrate the present invention. Because these examples are given for illustrative purposes only, they are not intended and should not be construed as limiting the invention in any way.

EXAMPLE I

Polypropylene resin having a melt index of about 0.7 and a density of about 0.92 was melt extruded at 230°C. through an eight inch slit die of the coat hanger type using a one inch extruder with a shallow metering screw. The length to diameter ratio of the extruder barrel was 24:1. The extrudate was drawndown very rapidly at a melt drawdown ratio of 150, and contacted with a rotating casting roll maintained at 50°C., 0.75 inches from the lip of the die. The non-porous precursor film produced in this fashion was found to have the following properties: thickness, 1 mil (0.001 inch); recovery from 50 percent elongation at 25°C., 50.3 percent crystallinity, 59.6 percent.

A sample of this film was oven annealed in an air atmosphere with a slight tension at 140°C. for about 30 minutes, removed from the oven and allowed to cool. It was found to have the following properties: recovery from 50 percent elongation at 25°C., 90.5 percent; crystallinity, 68.8 percent.

The annealed elastic film was then cold drawn at 25°C. after which the film was hot drawn at 145°C. to produce a total draw (extension in length) of 100 percent. The extension ratio was 0.9, that is, 10 percent of the stretching resulted from the cold drawing step and 90 percent of the stretching was a result of the hot drawing step. The cold and hot drawing step resulted in the formation of micropores. The microporous film was thereafter heat set under tension, i.e., at constant length, at 145°C. for 10 minutes in air to produce the polypropylene microporous substrate film of the instant invention.

EXAMPLES II – IV

A representative length of the microporous substrate film made in accordance with Example I was coated by the reverse roll coating method employing a 7 percent by weight solution of an imidazoline tertiary amine surfactant, Emcol AL–42–12, an imidazoline surfactant produced by Witco Company, in acetone. The final coated microporous film comprised 9.7 percent of the surfactant measured as a percent by weight of the uncoated substrated film.

The same procedure was repeated with the 7 percent imidazoline surfactant solution replaced with a 7 by weight solution of Dow-Corning 479A fluid, a nonionic water soluble silicon glycol copolymer, more specifically, a polyoxyethylene polymethyl siloxane. Again, the coating procedure comprised the reverse roll coating method and the 7 percent by weight solution of the silicon glycol copolymer surfactant again employed acetone as the solvent. The surfactant coating represented 8.2 percent by weight of the uncoated microporous film or more simply stated 8.2 percent add-on.

A third sample of the uncoated microporous polypropylene film was coated by the same procedure as specified for the second sample again employing Dow Corning 470A surfactant. In this case a 14.0 percent add-on of the silicon glycol copolymer resulted.

The three coated microporous films were cut into shapes emulating the size of typical battery separators. They were then individually tested in a electrolyte commonly employed in batteries, a 40 percent potassium hydroxide solution. As those skilled in the art are aware, alkaline batteries all employ, as electrolytes, a 25 to 45 percent solution of KOH. (Additionally, these solutions sometimes include small quantities of lithium hydroxide). Among the battery types that employ potassium hydroxide solutions are high performance batteries such as nickel-cadmium, nickel-iron, silver-zinc, silver-cadmium, manganese-zinc and mercury zinc.

The test consisted of imposing a known electrical potential between the anode and cathode disposed in the electrolyte, a 40 percent by weight solution of KOH in water. The electrical current generated was measured and the resistance of the electrolytic cell was determined by Ohm's Law. The coated film sample acting as a battery separator was then disposed between the anode and cathode and the same electrical potential was imposed across the electrodes. The generated electrical current was again measured and the resistance was again calculated by using Ohm's Law. The second resistance calculated was, of course, higher than the first measured resistance. The difference between the two values represented the resistance due to the coated microporous film acting as a battery separator.

The second measurement, the measurement in which the coated film is disposed between the electrodes in the cell, was taken one hour after placing the coated film battery separator into the electrolyte. The test was repeated 24 hours after disposing the battery separator into the cell. The test was repeated for a third time 13 days after disposing the separator into the cell. The results of this test appear in Table I. It should be noted that the electrical resistance is reported in milliohms-square inches. The area term, square inches, is used so as to make possible comparisons for different size battery separators.

TABLE I

| Example | Surfactant | %Add-on[1] | Electrical Resistance[3] | | |
|---|---|---|---|---|---|
| | | | 1 Hour | 1 Day | 13 Days |
| II | Imidazoline Tertiary Amine | 9.7% | O.L.[2] | 600 | 6.9 |

TABLE I—Continued

| Example | Surfactant | %Add-on[1] | Electrical Resistance[3] 1 Hour | 1 Day | 13 Days |
|---|---|---|---|---|---|
| III | Silicon Glycol | 8.2% | 12 | 9.1 | 9.0 |
| IV | Silicon Glycol | 14.0% | 17.4 | 17.2 | 12.8 |

[1]. Percent by weight of the uncoated film.
[2]. Overload, resistance beyond range of instrument.
[3]. In 40% KOH electrolyte measured as milliohms-square inches.

In order to evaluate the data presented in Table I it should be appreciated that a battery separator having a resistance of 20 milliohm-square inches or below is acceptable. Of course, the lower this value, the better is the battery separator.

Example II which represents the imidazoline tertiary amine surfactant coated microporous film of the prior art is included to illustrate the best of the prior art. Of the many surfactants suggested for usage with microporous films in pending application, Ser. No. 106,564, Emcol AL-42-12, an imidazoline, represents an excellent surfactant uneffected chemically by exposure to strong electrolytes. The results of this test clearly indicate that such a surfactant typical of the prior art, is unsatisfactory for usage after 24 hours exposure of the coated battery separator in 40 percent solution of potassium hydroxide. On the other hand, the two silicon glycol copolymer surfactants coated microporous films both exhibited acceptable battery separator resistivity within one hour of their insertion into the 40 percent potassium electrolytic solution.

EXAMPLE V – IX

Five additional examples of uncoated polypropylene microporous film made in accordance with the procedure enumerated in Example I were coated by the procedure employed in Examples II–IV. In these examples the coating solutions, i.e., 7 percent by weight solutions in acetone, ranged from 100 percent imidazoline tertiary amine to 100 percent of silicon glycol copolymer (polyoxyethylene polymethyl siloxane) surfactant of the instant invention and included three samples comprising surfactant samples which represented the imidazoline tertiary amine and the polyoxyethylene polymethyl siloxane silicon glycol copolymer. Three battery separators were formed from each of the five coated microporous films. Each of these three samples were tested in an electrolytic cell filled with a 40 percent potassium hydroxide solution and tested in accordance with the procedure enumerated in Examples II–IV. However, the test was limited to readings after one and 24 hours. The electrical resistivity of the three separate sample tests for each different coating were averaged and recorded as milliohms-square inches. The results of these tests are summarized in Table II. Table II includes, in addition to the information discussed above, the range of electrical resistance, measured after 24 hours, for the three samples similarly coated microporous films.

TABLE II

|  | V | VI | VII | VIII | IX |
|---|---|---|---|---|---|
| Imidazoline Tertiary Amine, % by weight | 100 | 75 | 50 | 25 |  |
| Polyoxyethylene Polymethyl Siloxane, % by weight |  | 25 | 50 | 75 | 100 |
| Avg. Elect. Resistance, after 1 hr., milliohms-in.[2] | O.L.[1] | 9.3 | 7.8 | 9.3 | 14.0 |
| Avg. Elect. Resistance, after 24 hrs., milliohms-in.[2] | O.L. | 10.3 | 8.1 | 7.8 | 13.1 |
| Range, Elect. Resistance after 24 hrs. | O.L. | 7.3–13.5 | 7.3–13.5 | 6.8–9.3 | 11.–17. |
| % Surfactant, % by weight of uncoated film | 9.8 | 11.6 | 12 | 12.4 | 12.7 |

[1]Overload.

The results of these tests indicate again the unsuitability of imidazoline, an otherwise excellent surfactant for normally hydrophobic microporous film substrates, in battery separator applications because of the slow wettability of imidazoline coated microporous films with water. As indicated in Table II, after 1 hour and 24 hours the value of electrical resistance for imidazoline coated microporous film was so high as to be unreadable. The silicon glycol copolymer surfactant of the instant invention in this case, polyoxyethylene polymethyl siloxane, again proved suitable for employment as a battery separator in view of its rapid wettability resulting in its electrical resistance being significantly below the acceptable limit of 20 milliohms-square inches.

The most surprising results were Examples VI–VII. In these examples silicon glycol copolymer surfactant of the instant invention was blended with an amidazoline tertiary amine. Surprisingly, the average electrical resistance of microporous films coated with this surfactant blend were lower even than the totally satisfactory silicon glycol copolymer surfactant coated microporous films. The best results were attained employing a silicon glycol copolymer imidazoline surfactant mixture. These results seem to indicate that silicon glycol copolymers provide the absolutely necessary instant wettability property whereas imidazoline, probably a slightly better surfactant over long periods, as indicated in Table I by the 13 day electrical resistance data, provides greater hydrophilicity to the substrate.

The above preferred embodiments and examples are given to illstrate the scope and spirit of the instant invention. Other preferred embodiments and examples within the scope and spirit, such as the use of other surfactants blended with the silicon glycol copolymer surfactant of the instant invention are within the contemplation of the instant invention. The instant invention, therefore, should be limited only by the appended claims.

What is claimed is:

1. A hydrophilic microporous film comprising a hydrophobic microporous polymeric film characterized by having a reduced bulk density as compared to the bulk density of the corresponding precursor film, a crystallinity of about about 30 percent, an average pore size of about 100 to 12,000 Angstroms and a surface area of about 2 to about 200 square meters per gram coated with a surfactant comprising a silicon glycol copolymer which renders said hydrophobic film hydrophilic.

2. A hydrophilic film in accordance with claim 1 wherein said silicon glycol copolymer surfactant is a polyoxyethylene polymethyl siloxane.

3. A hydrophilic film in accordance with claim 1 wherein said surfactant coating includes a second surfactant component.

4. A hydrophilic film in accordance with claim 3 wherein said second surfactant component is an imidazoline tertiary amine.

5. A hydrophilic coated film in accordance with claim 1 wherein said surfactant coating represents 2 to 20 percent by weight of the uncoated microporous film.

6. A hydrophilic film in accordance with claim 1 wherein said microporous film has a pore size no greater than 5000 Angstroms.

7. A hydrophilic film in accordance with claim 1 wherein said microporous film is further characterized by a void volume in the range of about 20 to 45 percent.

8. A hydrophilic film in accordance with claim 7 wherein the microporous film has a surface area in the range of about 20 and 60 square meters per gram and a crystallinity of between 30 and 70 percent.

* * * * *